March 24, 1959 E. J. SCHUBERT 2,879,458

DIODE MATRIX

Filed Oct. 30, 1957 3 Sheets-Sheet 1

WITNESSES

Edwin E. Bassler

Leon M. Garman

INVENTOR

Ernest J. Schubert

BY

ATTORNEY

March 24, 1959 E. J. SCHUBERT 2,879,458

DIODE MATRIX

Filed Oct. 30, 1957 3 Sheets-Sheet 2

United States Patent Office 2,879,458

Patented Mar. 24, 1959

2,879,458

DIODE MATRIX

Ernest J. Schubert, Glen Burnie, Md., assignor to Westinghouse Electric Corporation, East Pittsburgh, Pa., a corporation of Pennsylvania Application October 30, 1957, Serial No. 693,303

11 Claims. (Cl. 317—234)

This invention relates to a diode matrix and more particularly to a large number of diodes placed on an insulated lamina for use in digital computors.

In computor programming and memory circuits, it has been generally common to provide a plurality of diodes connected into a system as individual diodes formulating a complex and large machine circuit. This arrangemen is handicapped by being inflexible and cumbersome.

It is therefore an object of this invention to provide a diode matrix that is small in size and epecially adaptable for computor use.

Another object of this invention is to provide a diode matrix capable of being reprogrammed without a major modification of the equipment.

It is another object of this invention to provide a diode matrix that can be rapidly changed to provide different memory selections.

Other objects, purpses and characteristics of this invention will become clear as the description of the invention progresses.

In this invention there is provided an insulating lamina having strips of unidirectional conducting material inserted therein with a plurality of contact fingers or members positioned to be selectably placed in contact with the unidirectional material. The contact fingers are mounted on an insulating base and indexed to match the unidirectional positions.

In each of the several views, like parts bear similar reference characters.

Figure 1:
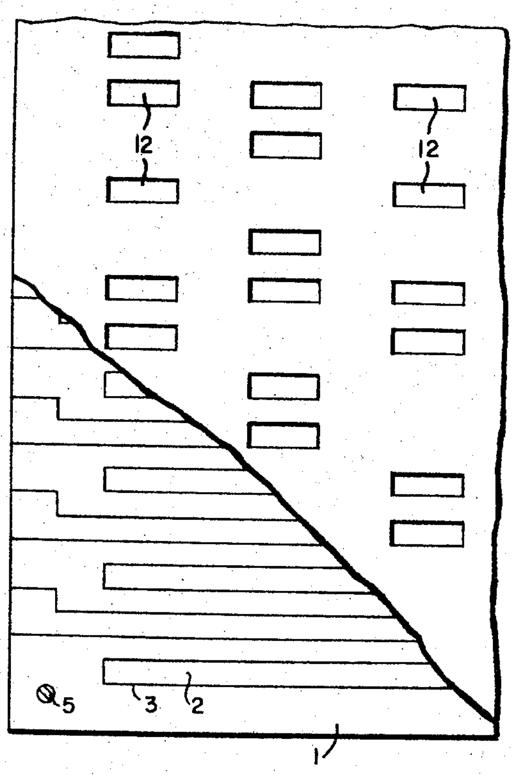
Fig. 1 is a plan view of one embodiment with a portion broken away to better illustrate the structure.

The embodiment of the diode matrix shown in Fig. 1 is provided with a base 1 having a plurality of metallic strips 2 coated by a material such as selenium for the purpose of providing rectification as will be explained hereinafter. The metallic strips 2 are preferably inserted in recesses 3 in the base member 1 for the purpose of presenting a smooth surface on the base member 1. The base 1 is preferably constructed of an insulating lamina of the thermoplastic type having good electrical insulating qualities. The metallic strips 2 may be provided with the rectifier material impregnated over the entire surface or may be provided with spots of selenium placed along the strips in the proper position to be contacted by other parts of the structure to be described hereinafter.

Figure 2:
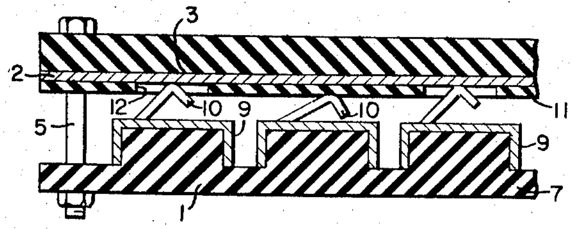
Fig. 2 is a cross-sectional view of the embodiment of Fig. 1 of the invention.
Figure 3:
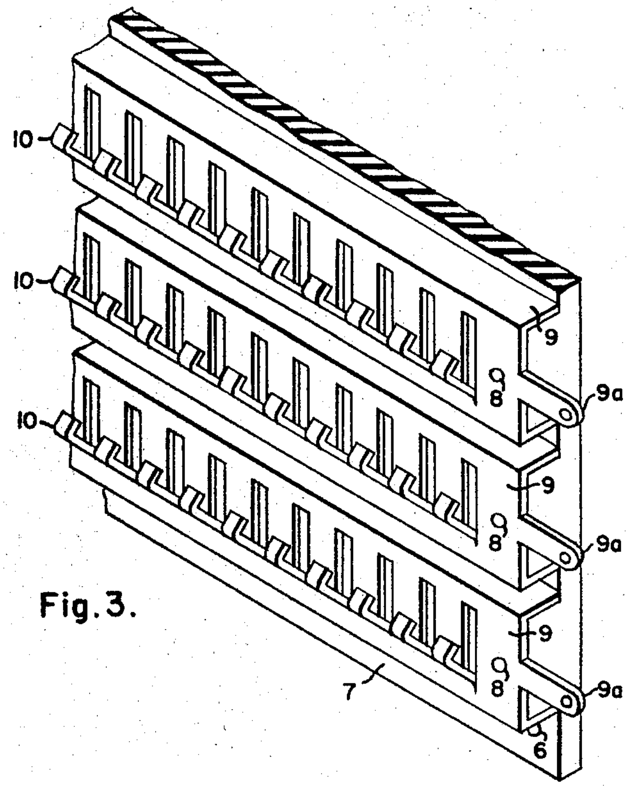
Fig. 3 is a view of the cover of the embodiment of Fig. 1 showing the structure of the contact fingers of this embodiment.

The insulating base 1 is provided with a plurality of upstages indexing pins or screws 5 shown in Fig. 2. These screws are preferably placed in the four corners of the base 1. The indexing screws 5 extend upwardly from the base 1 a sufficient distance to be received within corresponding openings 6 in attached cover 7 also constructed of suitable insulating material such as the thermoplastic lamina.

The top cover 7 is provided with a plurality of conducting strips 9 secured thereto by any suitable means such as rivets 8, and are secured to the top cover 7 in a position transverse to the rectifying strips 2 when the top cover is placed over the indexing screws 5. The strips 9 are provided with terminal connecting points **9*a* and a plurality of integral contact fingers 10 constructed of a resilient material. The contact fingers 10 are positioned to engage the selenium strips 2 when the top cover is in place over the indexing screws 5. The contact fingers extend outwardly from their supporting strip members 9 and are provided with upturned ends presenting contact surfaces engageable with the selenium strips 2**.

Since it is sometimes desirable to provide a means for selecting contacts between the contact fingers 10 and the selenium strips 2 for the purpose of forming a program for the equipment using this matrix, an interposing mask or indexing card 11, is provided having a plurality of openings, such as the openings 12 shown in Fig. 2, positioned to align with certain of the indexing fingers 10 when this mask is received over the indexing screws 5. The fingers falling within the openings 12 can therefore make contact with the selenium strips 2 when the mask and top cover 7 are placed over the indexing pins or screws 5 and secured in place. The remaining indexing screws 10, however, are held in separation by the interposed mask and therefore maintained in electrical separation as long as this mask is in place. A typical example of a finger being received within an opening and a finger being held separated from the selenium strips is shown in Fig. 1.

In order to change the program of the matrix, it is merely necessary to remove the securing nuts 13 from the indexing screws 5, the top cover 7, and the interposed mask or card 11 and insert a new card 11, having a different arrangement of openings 12, over the indexing pins or screws 5. After this is done, the top cover 7 is again replaced over the indexing pins or screws 5 and the nuts 13 put in place holding the contact fingers in firm engagement with the selenium stripping 2 where openings occur in the card 11.

Another modification of the structure of Fig. 1 utilizes a metal clad lamina 1 preferably rolled copper or aluminum on thermosetting base. The metal serves as support for the semiconductor alloy. Either before or after application of the semiconductor the pattern of parallel strips 2 is etched in any of the known techniques. Prime advantage of this method is production of extremely compact and precisely aligned diode matrices.

Figure 4:
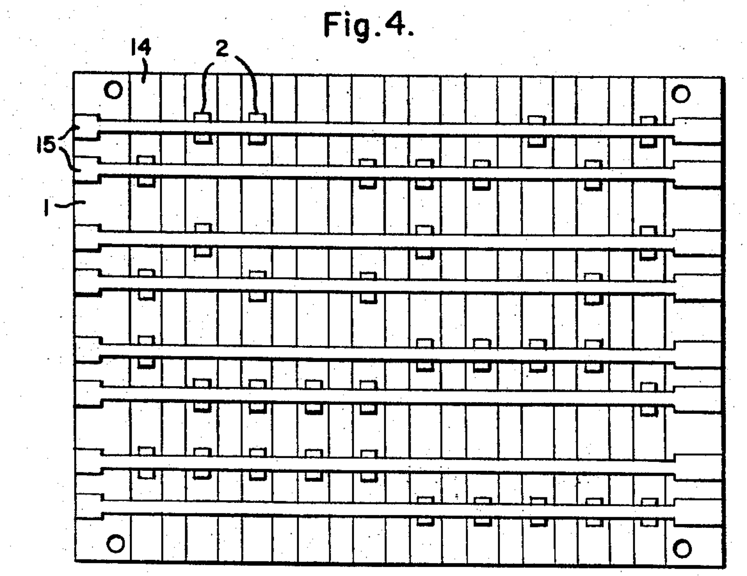
Fig. 4 is a plan view of another embodiment of the diode matrix of this invention.

The species shown in Fig. 4 represent the use of selenium spots 14 on conducting strips 2 with the selenium spots being raised above the surface of the conducting strips 2. The area over the base 1 around the selenium spots 14 is then coated with a thermoplastic or thermosetting lacquer of good insulating quality and the strip members 15 of any suitable material is then secured by the thermoplastic in position across each of the selenium contacts 14. This matrix is a permanent type of matrix and can be used for only one program. The matrix has the advantage, however, of being extremely small for its function.

It is pointed out that the strips 15, placed transverse to the strips 2 in the embodiment of Fig. 4, may be of a material capable of being painted to the surface with the painted material having good electrical characteristics.

Figure 5:
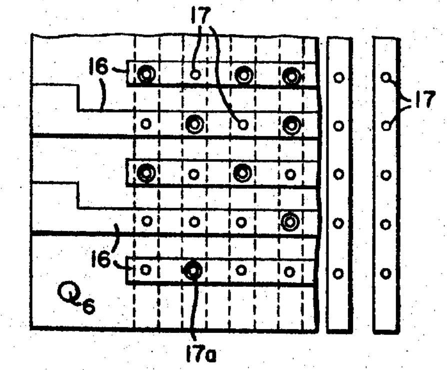
Fig. 5 is a view of a still different embodiment with the top cover removed and portions broken away to better illustrate the structure.
Figure 6:
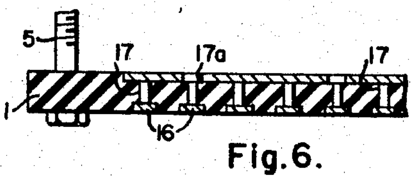
Fig. 6 is a cross-sectional view of the embodiment of Fig. 5.

Figures 5 and 6 show the insulating base 1 as being provided with transverse conducting supplementing strips 16 provided with integral contact points 17 interconnecting the supplementing strips with the selenium strips 2.

The addition of the supplementing strips to the diode matrix is found to be important when the matrix is used with high frequencies. Without the supplementing strip an increasing amount of noise occurs in the output in proportion to the distance the diode is from the input of the matrix.

The supplementing strips 16 are parallel to the conducting strips 9 on the cover 7 and are connected to the selenium strips 2 at selected points (as desired) by the contact points 17. Where contact is not desired the contact points 17 are drilled or etched away as at **17*a***.

Figure 7:
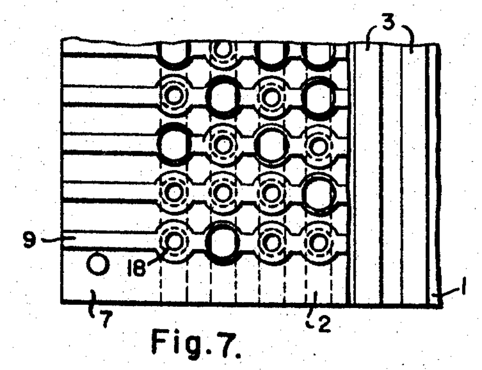
Fig. 7 is a view of a conductor strip cover showing novel electrical diode connections.
Figure 8:
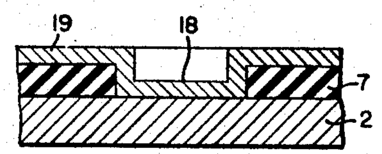
Fig. 8 is a view of another conductor strip cover showing a different method of providing diode electrical connections.
Figure 9:
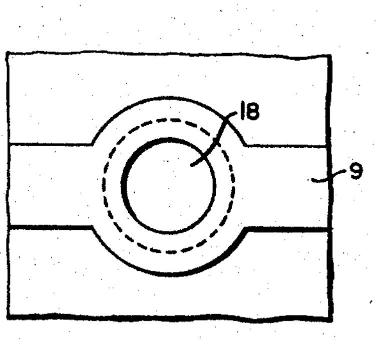
Fig. 9 is an enlarged cross-sectional view of one of the connections of Fig. 7.

The embodiment of Figs. 7, 8, 9, 10 and 11 show a new method of connecting the selenium strips 2 with the conductor strips 9. As shown in Figs. 8 and 9, the junction is made through the conductor strip dimples 18, which, when desired, is destroyed by mechanical means such as milling (see Figs. 10 and 11) to remove the connection.

Figure 10:
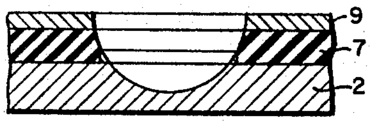
Fig. 10 is an enlarged plan view of one of the connections of Fig. 7.
Figure 11:
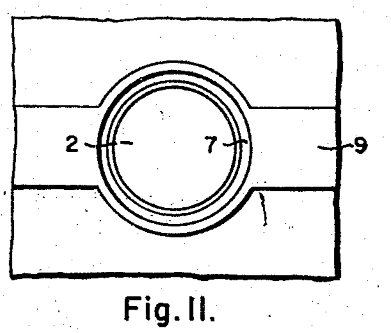
Fig. 11 is an enlarged cross-sectional view of the connections of Fig. 9 showing the connection interrupted.

The dimple 18 normally extends through the top cover 7 and contacts the selenium strip 2 as shown in Fig. 8. To destroy the diode connection the dimple is milled or drilled until the electrical connection is broken such as shown in Figs. 10 and 11.

Figure 12:
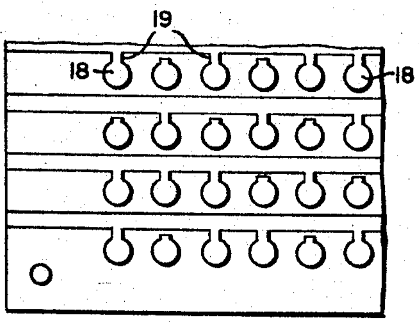
Fig. 12 is an enlarged plan view of the interrupted connection of Fig. 11.

The embodiment of Fig. 12 is one showing the dimples such as the dimples 18 of Figs. 7 and 8 as being adjacent to the strips 9 and electrically connected thereto by junction members 19. In order to remove a diode from operation, the junction point 19 is milled or otherwise destroyed severing any electrical connection.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. A diode matrix comprising an insulating means provided with a plurality of parallel recesses, rectifier strips positioned in said recesses, a second insulating means positioned over said first insulating means, parallel conductors secured to said second insulating means at substantially right angles to said rectifier strips, and means interconnecting selected ones of said conductors to selected selenium strips.

2. A diode matrix comprising an insulating base provided with a plurality of parallel recesses, selenium conducting means positioned in said recesses, insulating cover means for said insulating base, metallic conducting means in said insulating cover positioned transverse to and in a position to contact said selenium conducting means, control means positioned between said selenium conducting means and said metallic conducting means for preventing selected contacts between said selenium conducting means and said metallic conducting means.

3. A diode matrix comprising an insulating base provided with a plurality of parallel recesses, selenium conducting means positioned in said recesses, insulating cover means for said insulating base, metallic conducting means in said insulating cover positioned transverse to and in a position to contact said selenium conducting means, control means positioned between said selenium conducting means, said metallic conducting means for preventing selected contacts between said selenium conducting means and said metallic conducting means, said control means comprising an insulating member inserted between said selenium conducting means and said metallic conducting means, and said insulating member having openings for providing selected selenium conducting means to metallic conducting means contact.

4. A diode matrix comprising an insulating base provided with a plurality of parallel recesses, rectifier conducting means positioned in said recesses, insulating cover means for said insulatory base, metallic conducting means in said insulating cover, positioned transverse to and in a position to contact said rectifier conducting means, said metallic conducting means for preventing selected contacts between said rectifier conducting means and said metallic conducting means, said control means comprising an insulating member inserted between said rectifier conducting means and said metallic conducting means, said insulating member having openings for providing selected rectifier conducting means to metallic conducting means contact, and said metallic conducting means comprising parallel metallic strips provided with resilient contact fingers capable of passing through said insulating member openings.

5. A memory device comprising an insulating base, rectifier spaced apart conducting members secured to said base, a second insulating member positioned in opposition to said insulating base, conducting strips secured to said second insulating member in a position of cooperation with said conducting members, and a control member positioned between said conducting members and said conducting strips, said control member being provided with selected openings to allow conducting member to conducting strip contact, said contacts being capable of allowing unidirectional current flow.

6. A matrix comprising an insulating base, metallic conducting means in said base, a plurality of selenium spots on said conducting means, an insulating cover, electrical members on said insulating cover positioned to cross said metallic conducting means, resilient contact members, integral with said electrical member and positioned to contact said selenium spots, and insulating control means reversibly positioned between said base and said cover, said control means having openings for allowing selected ones of said resilient contact members to contact said selenium spots while holding the remaining ones of said resilient contact members away from their associated selenium spots.

7. A matrix comprising an insulating base, metallic conducting means in said base, a plurality of selenium spots on said conducting means, an insulating cover, electrical members on said insulating cover positioned to cross said metallic conducting means, resilient contact members integral with said electrical members and positioned to contact said selenium spots, insulating control means reversibly positioned between said base and said cover, said control means having openings for allowing selected ones of said resilient contact members to contact said selenium spots while holding the remaining ones of said resilient contact members away from their associated selenium spots and said insulating control means being in the form of an insulating card.

8. A matrix comprising an insulating base, metallic conducting means in said base, a plurality of selenium spots on said conducting means, an insulating cover, electrical members on said insulating cover positioned to cross said metallic conducting means, resilient contact members integral with said electrical members and positioned to contact said selenium spots, insulating control means reversibly positioned between said base and said cover, said control means having openings for allowing selected ones of said resilient contact members to contact said selenium spots while holding the remaining ones of said resilient contact members away from their associated selenium spots and said insulating card being interchangeable with other similar cards having different opening positions.

9. A diode matrix comprising an insulating means provided with a plurality of parallel recesses, selenium coated strips positioned in said recesses, a second insulating means poitioned over said first insulating means, parallel conductors secured to said second insulating means at substantially right angles to said selenium coated strips, said conductors having dimple projections extending through said second insulating means for contact with said selenium strips, said projections being selectively destructible to remove selected contacts with said selenium strips.

10. A diode matrix comprising an insulating means provided with a plurality of parallel recesses, selenium coated strips positioned in said recesses, a second insulating means poitioned over said first insulating means, parallel conductors secured to said second insulating means at substantially right angles to said selenium coated strips, and means interconnecting selected ones of said conductors to selected selenium strips, said interconnecting means comprising contact dimples penetrating said second insulating member, said dimples being connected to said conductors by junction members, said junction members being selectively destructible to isolate selected dimples.

11. A diode matrix comprising an insulating means provided with a plurality of parallel recesses, selenium coated strips positioned in said recesses, a second insulating means positioned over said first insulating mean, parallel conductors secured to said second insulating means at substantially right angles to said selenium coated strips, and means interconnecting selected ones of said conductors to selected selenium strips, and supplementing conduction strips secured to said insulating means and positioned parallel to said parallel conductors, said supplementing conduction strips being selectively secured to said selenium strips.

References Cited in the file of this patent

UNITED STATES PATENTS 2,821,691 Andre et al. ------------ Jan. 28, 1958